United States Patent [19]

Schultalbers et al.

[11] Patent Number: 5,782,092
[45] Date of Patent: Jul. 21, 1998

[54] ARRANGEMENT CONTROLLING THE OUTPUT PRESSURE OF A TURBOCHARGER FOR AN INTERNAL COMBUSTION ENGINE

[75] Inventors: Winfried Schultalbers, Meinersen; Volker Böstfleisch, Neckarsulm, both of Germany

[73] Assignee: Volkswagen AG, Wolfsburg, Germany

[21] Appl. No.: 657,589

[22] Filed: Jun. 7, 1996

[30] Foreign Application Priority Data

Jun. 7, 1995 [DE] Germany ............... 195 20 665.7

[51] Int. Cl.[6] .................................. F02B 37/12
[52] U.S. Cl. ........................................... 60/602
[58] Field of Search ......................... 60/600–603

[56] References Cited

U.S. PATENT DOCUMENTS

| | | | |
|---|---|---|---|
| 4,685,302 | 8/1987 | Abo et al. | 60/602 |
| 4,686,830 | 8/1987 | Buck et al. | 60/602 |
| 4,702,080 | 10/1987 | Ueno et al. | 60/602 |
| 4,848,086 | 7/1989 | Inoue et al. | 60/602 |
| 4,891,947 | 1/1990 | Kishi et al. | 60/602 |
| 5,261,236 | 11/1993 | Ironside et al. | 60/600 |
| 5,442,918 | 8/1995 | Baeuerle et al. | 60/602 |

FOREIGN PATENT DOCUMENTS

| | | |
|---|---|---|
| 433560 | 6/1991 | European Pat. Off. . |
| 3507095 | 9/1985 | Germany . |
| 3438176 | 4/1986 | Germany . |
| 4120055 | 1/1992 | Germany . |
| 2164099 | 3/1986 | United Kingdom . |
| WO9001113 | 2/1990 | WIPO . |

Primary Examiner—Michael Koczo
Attorney, Agent, or Firm—Baker & Botts, L.L.P.

[57] ABSTRACT

A control arrangement for a turbocharger for an internal combustion engine with a variable turbine geometry which includes a control unit for controlling a turbocharger output pressure according to engine operating parameters when the engine is operating in a first engine load range with regulated exhaust gas return and a pressure controller for controlling the turbocharger output pressure when the engine is operating in a second engine load range with the exhaust gas return switched off including allowance for a precontrol by the control unit.

10 Claims, 6 Drawing Sheets

ARRANGEMENT CONTROLLING THE OUTPUT PRESSURE OF A TURBOCHARGER FOR AN INTERNAL COMBUSTION ENGINE

BACKGROUND OF THE INVENTION

This invention relates to arrangements for controlling the output pressure of a turbocharger for an internal combustion engine.

German Patent No. 35 07 095 discloses a control arrangement for a turbocharger which has a variable turbine geometry, i.e., a "VTG" supercharger, in which the variable turbine geometry is actuated by at least one servo element, and which also includes a bypass valve controlled by an additional servo element and arranged to bypass the exhaust gas turbine.

To control the servo elements, the control arrangement operates in response to the throttle flap angle, the engine speed, the intake air flow rate, and signals from a knock sensor.

European Published Application No. 0 433 560 discloses an exhaust gas turbocharger having a variable turbine geometry and a bypass valve, both of which are actuated by a common servo element.

The aforementioned servo elements are in practice triggered at a specific duty cycle.

Further, it is generally known that internal combustion engines may be provided with a regulated exhaust gas return. In such cases, a partial exhaust flow, dependent on the engine operating range, is taken from the exhaust line and supplied through inlet passages to the engine intake system.

SUMMARY OF THE INVENTION

Accordingly, it is an object of the present invention to provide an arrangement for controlling the output pressure of a turbocharger for an internal combustion engine which overcomes disadvantages of the prior art.

Another object of the invention is to provide a control arrangement for the output pressure of a turbocharger for an internal combustion engine that produces an improved output, an enhanced engine torque and a lower fuel consumption, in an improved manner, throughout broad operating ranges of the engine, especially in partial-load ranges.

These and other objects of the invention are attained by providing a turbocharger output pressure control arrangement in which, for one engine operating load range, the turbocharger output pressure is controlled in accordance with data provided by a stored target output pressure diagram based on an engine operating parameter and, for another engine operating load, the turbocharger output pressure is controlled by an output pressure regulator.

In a control arrangement of this kind for the output pressure of a turbocharger for an internal combustion engine, in which the output pressure is controlled in a first engine load range according to target data read out from at least one target diagram and controlled in a second engine load range by a pressure controller combined with a precontrol by the target data read out of the target diagram, stable operation of the turbocharger is assured in that the output pressure is controlled under all conditions throughout a wide range of operation of the engine.

Such output pressure control based upon various control parameters, permits an optimal adjustment of the output pressure, permitting an early output pressure build-up while maintaining an elevated output pressure level throughout.

In a turbocharger having a fixed geometry and a bypass valve, the servo element controls and/or regulates the bypass valve, whereas in a turbocharger of variable turbine geometry the servo element acts primarily to control the variable geometry.

In an advantageous embodiment of the invention, the changeover between the control of output pressure based on stored engine operating parameter information and control of output pressure by a pressure controller in different engine load ranges is based upon a fuel injection rate which is a function of the rotational speed of the engine. In the first load range, preferably a range of comparatively low engine load, target data for the output pressure are read out of stored target diagrams as functions of rotational speed and fuel injection rate. These target data are converted into a definite duty cycle at which the servo element is to be triggered.

In a preferred operating system, the target data are read out of various diagrams, whereby, for example, the particular operating mode of a motor vehicle equipped with the turbocharger, for example sport mode or an economy mode, may be taken into account. Such an observance of the vehicle operating mode is known, for example, for adaptive transmission controls.

Further, the selection of target data may be effected with the aid of stored diagrams which take account of atmospheric pressure and air temperature.

In the second load range, with a controlled turbocharger output pressure, a pressure controller, preferably configured as a PID controller, is used. The PID controller is one which exhibits in its time response a proportional (P) component, an integral (I) component and a differential (D) component and is preferably composed in turn of a PI controller and D controller or DT1 controller connected in parallel therewith. A DT1 controller is a differential controller provided with a filter time constant designated T1. Because of the dynamic mode of operation of an internal combustion engine, the fast control by a P component is advantageous, while the I component avoids an undesirable oscillation.

The PI controller and the D or DT1 controller have inputs which in each instance receive both target and actual turbocharger output pressure values. The output of the PI controller is superimposed as a precontrol with the duty cycle being produced by the parameter-based pressure control unit. Then the component of the D control is taken into account, and from this the duty cycle is finally supplied to the servo element.

The turbocharger output pressure value supplied to the PID controller is a pressure value detected and filtered downstream from the compressor of the turbocharger, optionally with the atmospheric pressure taken into account.

When the pressure controller is operating, there is a continuous monitoring of the variation of the controller. This feature is especially advantageous for a turbocharger having variable turbine geometry. Since the controlled system varies during operation in such turbochargers, a controlled adaptation of the pressure controller operating parameters can be achieved in that a factor can be read out from at least one stored characteristic curve as a function of at least the engine speed and multiplied by a constant which is applied to the instantaneous pressure controller parameter to yield an adapted controller parameter depending on the variation of the controller. The factor may also be read out as a function of fuel consumption or in terms of a transmission gear detection rather than engine speed.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 6:
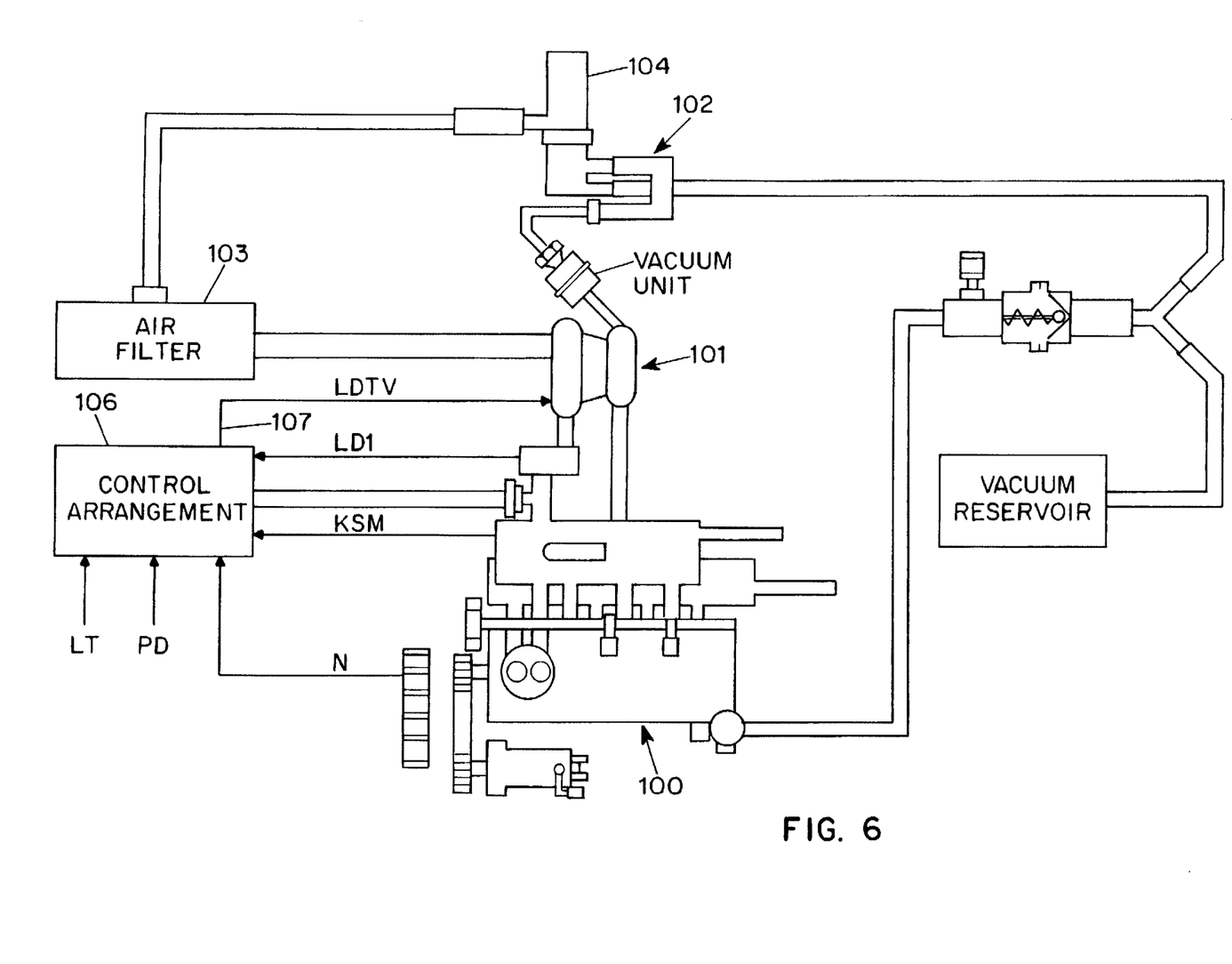
FIG. 6 is a schematic diagram illustrating a representative embodiment of an engine system provided with a turbocharger in accordance with the invention.

FIG. 6 illustrates schematically an internal combustion engine 100 for a motor vehicle provided with a variable turbine geometry (VTG) turbocharger 101 and having a regulated exhaust gas return 102 for the improvement of exhaust emissions. An air filter 103 receives intake air from an intake 104 to which exhaust gases are supplied by the exhaust gas return 102. Such an exhaust gas return, as well as a VTG turbocharger, is conventional, and hence will not be discussed in further detail. A control arrangement 106 containing control units described hereinafter, controls the operation of the turbocharger by a duty cycle signal LDTV applied through a line 107 which is derived from parametric signals representing engine speed (N), fuel injection flow rate (KSM), turbocharger output pressure (LD1), atmospheric pressure (PD), and ambient air temperature (LT).

Figure 1:
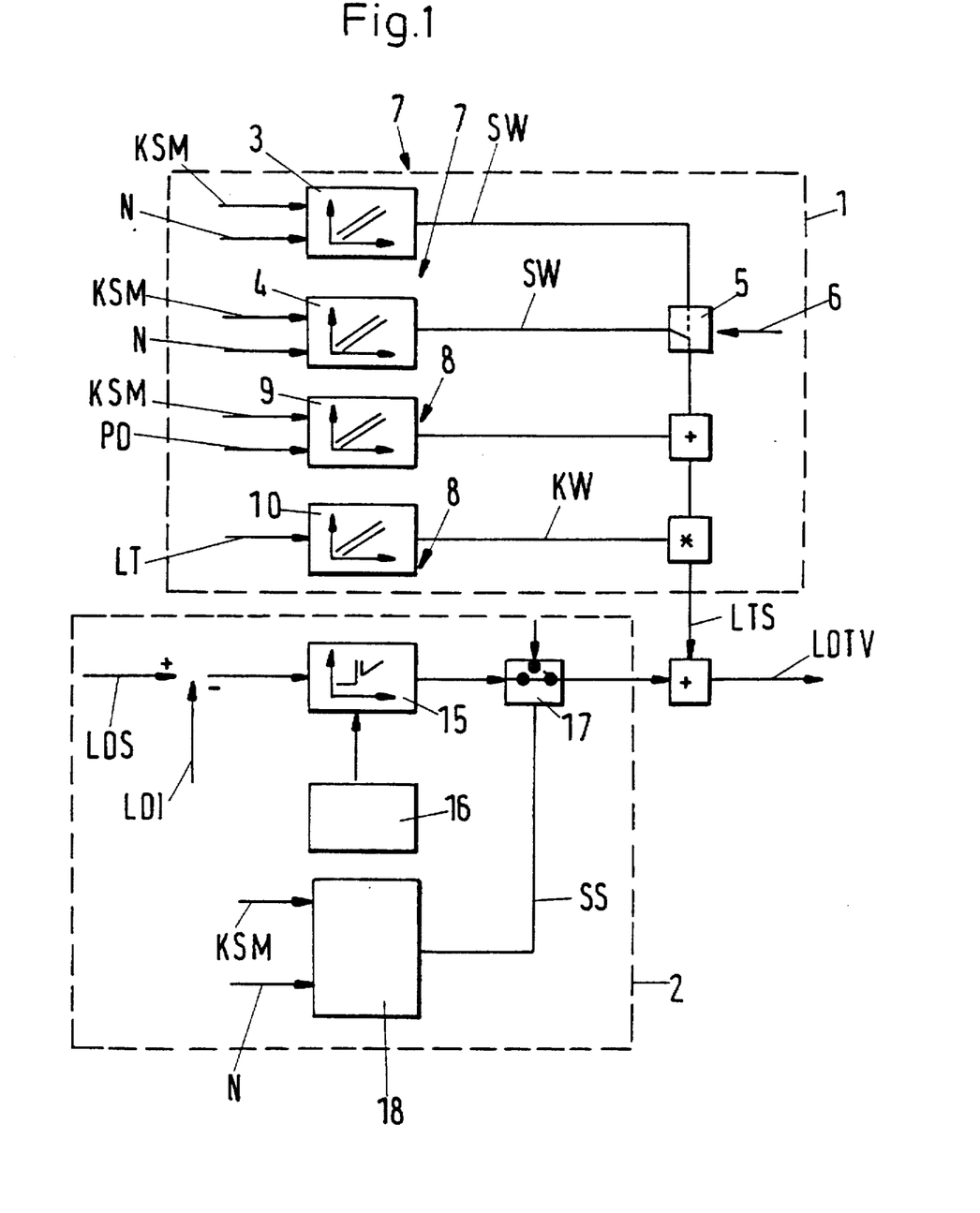
FIG. 1 is a schematic block diagram illustrating a representative embodiment of a turbocharger control arrangement according to the invention.

A typical embodiment of a control arrangement 106 for controlling the output pressure of a VTG turbocharger provided with a variable turbine geometry is shown in FIG. 1, and includes both a parameter-based pressure control unit 1 for actuating a servo element to control the operation of the turbocharger and a turbocharger output pressure controller unit 2. FIG. 1 schematically shows the cooperation of the parameter-based control unit 1 and the pressure controller unit 2 of the control arrangement and illustrates a duty cycle signal LDTV at the output for controlling a servo element which acts upon the variable turbine geometry of the turbocharger.

Figure 5:
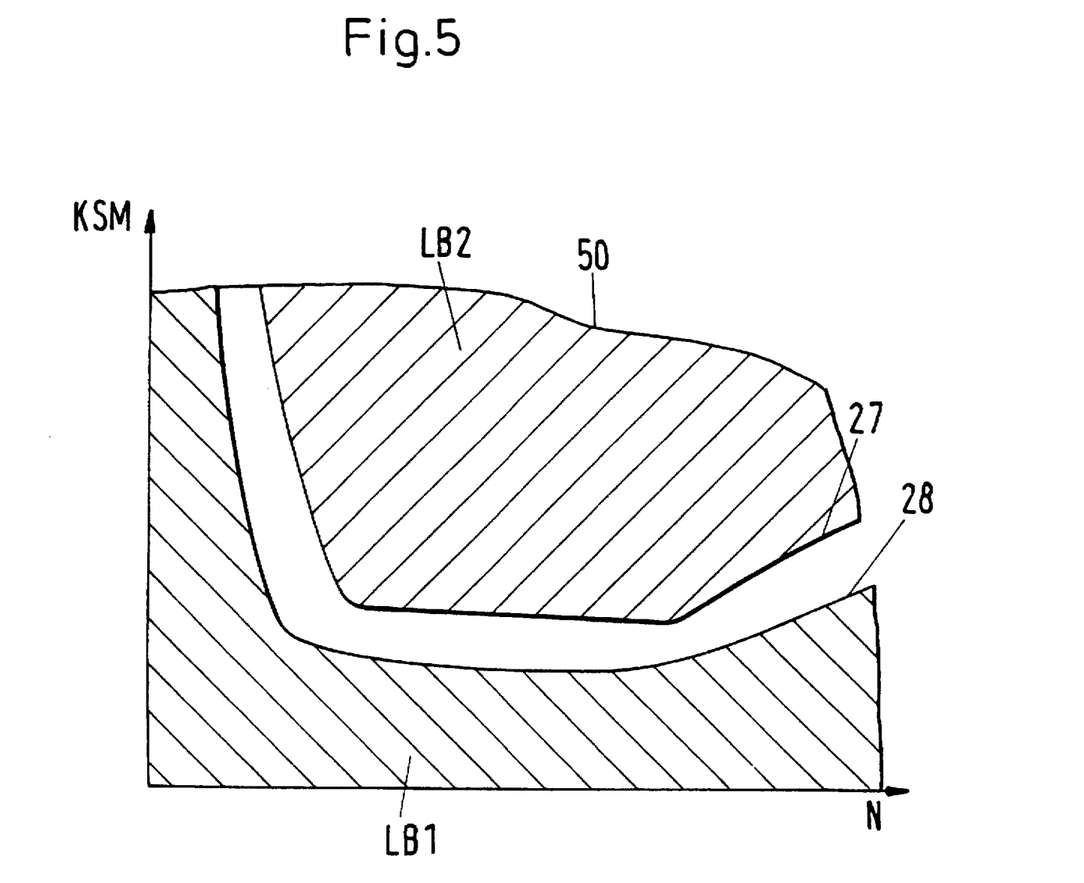
FIG. 5 is a graphical representation illustrating two engine operating load regions in a speed/fuel flow rate diagram.

In a first engine load region LB1 shown in the diagram of FIG. 5, the engine is operated at a comparatively low load and/or speed, with the regulated exhaust gas return switched on. In this first engine load region LB1, the turbocharger output pressure is controlled exclusively by the parameter-based pressure control unit 1. For this purpose, an output pressure duty cycle signal LTS is provided at the output side of the control unit 1 as shown in FIG. 1.

To produce the duty cycle signal LTS, target data SW are read out of several stored characteristic diagrams shown in FIG. 1 and combined in the following manner. Depending on the mode in which a motor vehicle provided with the turbocharger is operating, target data are read either from a sport mode diagram unit 3 or from an economy mode diagram unit 4 by selective operation of a switch 5 which is actuated in accordance with a mode signal 6. At the input side of each of the diagram units 3 and 4, signals representing an intermediate engine speed N and a fuel injection rate signal KSM are supplied. The sport and economy diagram units 3 and 4 are conventional target diagram units 7 containing stored graphical information relating desired duty cycle values to engine speed and fuel injection rate 7 from which the target duty cycle data SW for the applied engine speed and fuel injection rate values are read out.

Two correction diagram units 8 provide correction factors KW which are additively or multiplicatively combined with the target duty cycle data SW produced by the diagram 3 or 4. The input side of an atmospheric pressure correction diagram 9 in the first correction diagram unit 8 also receives the fuel injection rate signal KSM, as well as an atmospheric pressure signal PD. A correction factor based on the stored graphical information is read out and is additively combined with the target value SW supplied from the switch 5.

The second correction diagram unit 8 contains an ambient air temperature correction diagram 10 to which an ambient air temperature signal LT is supplied and a correction factor KW is read out as a function of the temperature. This correction factor is multiplicatively superimposed on the target value SW which has already been corrected with the aid of the atmospheric pressure diagram 5.

The fuel injection rate signal KSM is obtained in a conventional manner from a vehicle performance diagram (not shown) and from a known fuel flow rate which is required for idling operation of the engine, the vehicle performance diagram having as inputs the mean engine speed signal N and an accelerator position indicator signal.

The output pressure controller unit 2 shown in FIG. 1 comprises a pressure controller 15, arranged as a PID controller which is explained later with reference to FIG. 4, receiving on its input side a difference signal formed by combining a positive target output pressure signal LDS and a negative actual output pressure signal LD1. The determination of the LDS signal will be explained later with reference to FIG. 2.

For adaptation of the controlled turbocharger as its output varies resulting from the operation of the variable turbine geometry, the pressure controller 15 operates in an adapted mode with the aid of an adaptation unit 16. This unit 16 will be described in more detail later with reference to FIG. 3.

To switch the turbocharger output pressure control upon transition from the first engine load region LB1 to the second engine load region LB2, the output of the pressure controller 15 is connected to a switch 17. The switch 17 is actuated by a switch signal SS which is supplied by a function control unit 18 which will be explained in more detail in connection with FIG. 4.

Figure 2:
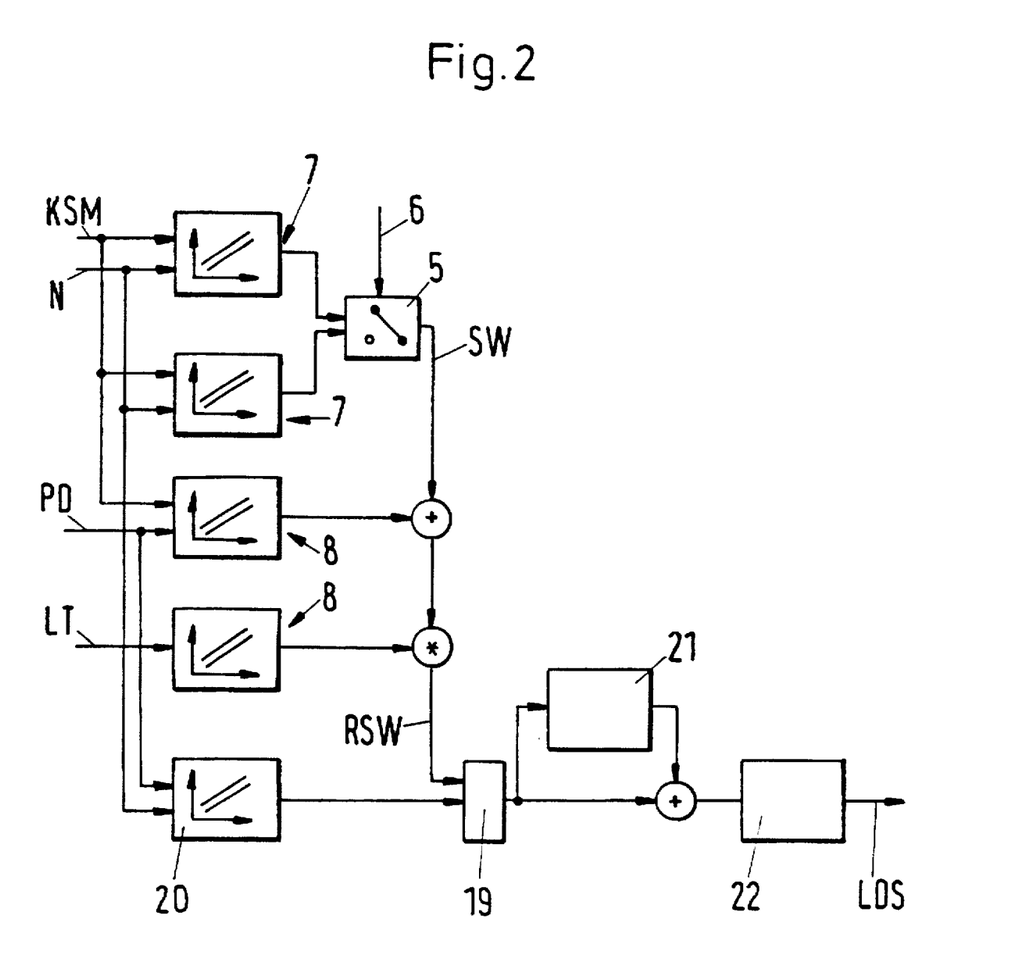
FIG. 2 is a schematic block diagram illustrating a representative arrangement for the determination of a target output pressure value.

The generation of the output pressure signal LDS, which is supplied to the controller 15, is explained as follows with reference to FIG. 2. A target value is read out of the target diagram unit 7 in a manner comparable to the generation of the output pressure duty cycle signal LTS from the control unit 1, in response to the mode signal 6, and that signal is then processed additively and/or multiplicatively with the aid of the correction diagrams and/or the correction unit to provide a target signal RSW as shown in FIG. 2. The crude target value RSW thus generated is then limited to a maximum value in a limiter 19. This maximum is read out of a stored limiter diagram 20 as a function of rotational engine speed N and the atmospheric pressure PD.

The crude target signal so limited is then branched and one branch is supplied to a difference amplifier 21, producing an output which is added to the other branch. The difference amplifier 21 contains separate parameters for small and large signals and furnishes a dynamic turbocharger output pressure target component at its output. The difference amplifier 21 is turned off when a change of operating mode occurs at the switch 5 so that the resulting target spike is not amplified. The target output signal value so obtained is then supplied to a target signal limiter 22 that limits the turbocharger output target signal LDS to a preestablished maximum and/or minimum value.

The function of the pressure controller unit 2 will now be explained in greater detail with reference to FIG. 4. The PID controller 15 of FIG. 1 consists of a PI controller 25 and a DT1 controller 26, i.e., a D controller with variable filter time constant T1, connected in parallel therewith. When the pressure controller is switched on by the switch 17, the control signal at the output of the PI controller 25 is combined with the LTS signal obtained from the control unit 1 for the purpose of pre-control and the DT1 controller 26 is connected in parallel therewith with its servo control signal then added to the output of the PI controller combined with the LTS signal as limited by a limiter 31.

As previously described, switching of the pressure controller on and off by the switch 17 takes place according to the switch signal SS received from the function control unit 18. The function control unit 18 is supplied with the fuel injection rate signal KSM and the engine rotational speed signal N. Switch-on of the pressure controller 2 does not occur until the fuel injection rate KSM exceeds a threshold, the value of which depends on the engine speed, that is read out of an upper characteristic curve unit 27 shown in FIG. 4. The switch-off of the pressure controller 2 occurs when the fuel injection rate KSM becomes equal to or less than a threshold value, dependent on engine speed, read out of a lower characteristic curve unit 28. For all speeds N the values read out of the characteristic curve unit 27 are greater than the values read out of the characteristic curve unit 28. To avoid a continual switching of the pressure controller on and off, the two characteristic curves 27 and 28 are supplied to the switching signal SS through a hysteresis unit 29.

When the turbocharger output pressure control unit is switched on, the integrating component I of the PI controller 25 is preset to zero. If a pressure deviation is present at switch-on, the proportional component P generates a spike at the output of the PI controller 25. The DT1 controller 26 is so connected that it produces a zero output immediately after the pressure controller is switched on.

An addition station 30 then supplies a signal representing the sum of the LTS signal and the pressure controller output to the limiter 31. In the limiter 31, the value is limited to a value read out from an upper characteristic curve 32 or a lower characteristic curve 33. The selection of values from these curves 32 and 33 is made according to the setting of a switch 34 which transmits the fuel consumption signal VS, the rotational speed signal N or a transmission gear identification signal GS.

The output of the limiter 31 is again subjected to a limitation between upper and lower limits by the characteristic curves 32 and 33 as previously described to produce the LDTV signal.

When the switch 5 is changed because of a change in the mode signal 6, a discontinuity occurs in the output pressure target signal LDS and in the output pressure duty cycle signal LTS of the control unit 1.

Figure 3:
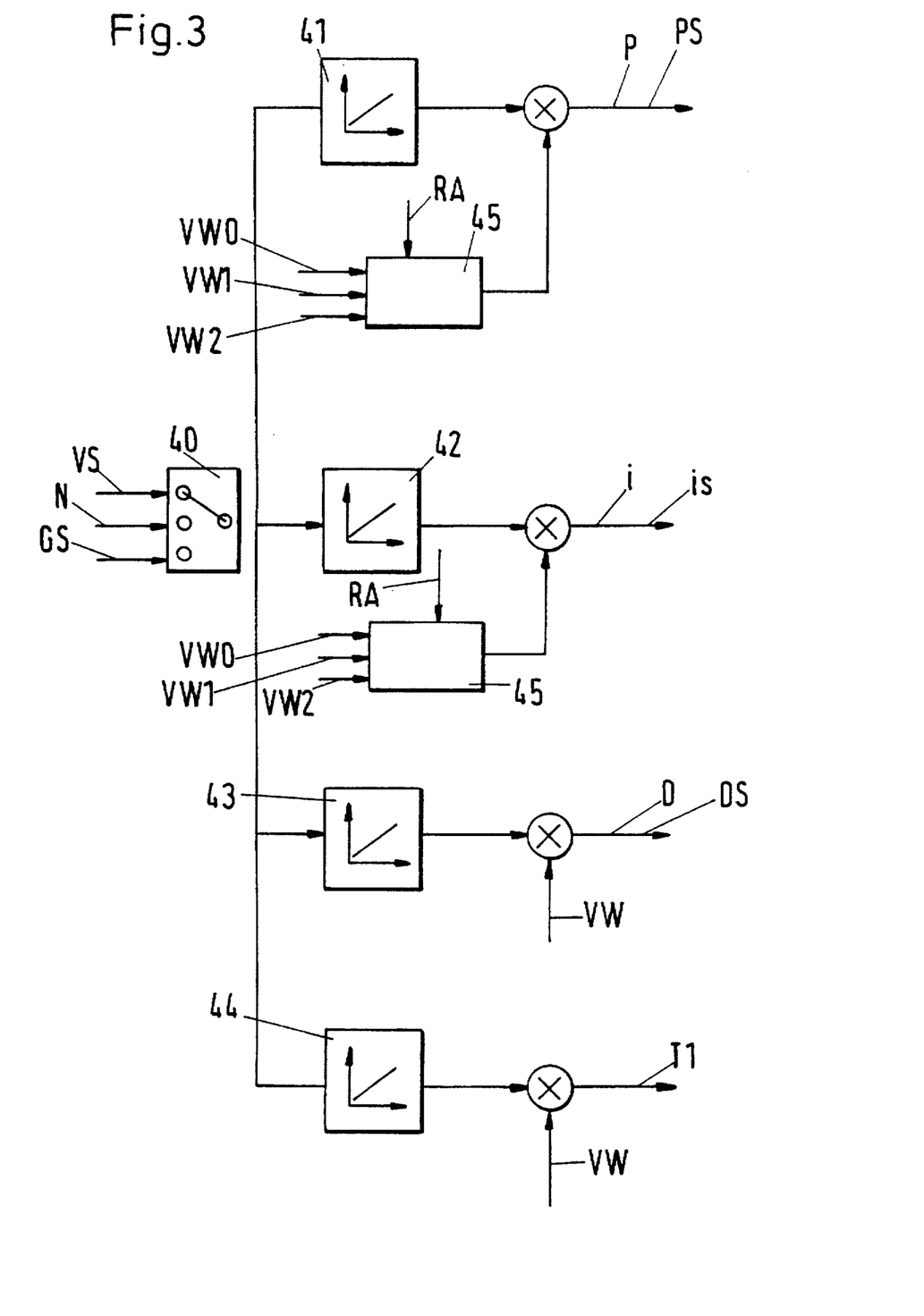
FIG. 3 is a schematic block diagram illustrating a representative arrangement for modifying control parameters.

The mode of operation of the adaptation unit 16 will now be explained in more detail with reference to FIG. 3. An adaptation switch 40 selects one of three input signals, the fuel consumption signal VS, the transmission gear identification signal GS or the speed signal N. The selected signal is then supplied to characteristic amplification curve units 41, 42, 43 and 44 associated with the instantaneous P, I and D components. The factors read out from the curves 41 and 42 are then multiplied by values read out as functions of the controller variation RA from two memory units 45. These memory units store predetermined amplification values VW 0, VW 1 and VW 2 for use with small and large factor signals.

The factor read out from the stored characteristic amplification factor curve 43 is multiplied by a fixed amplification VW and the resulting signal is combined with the filter time constant T1 determined from the amplification curve unit 44.

Figure 4:
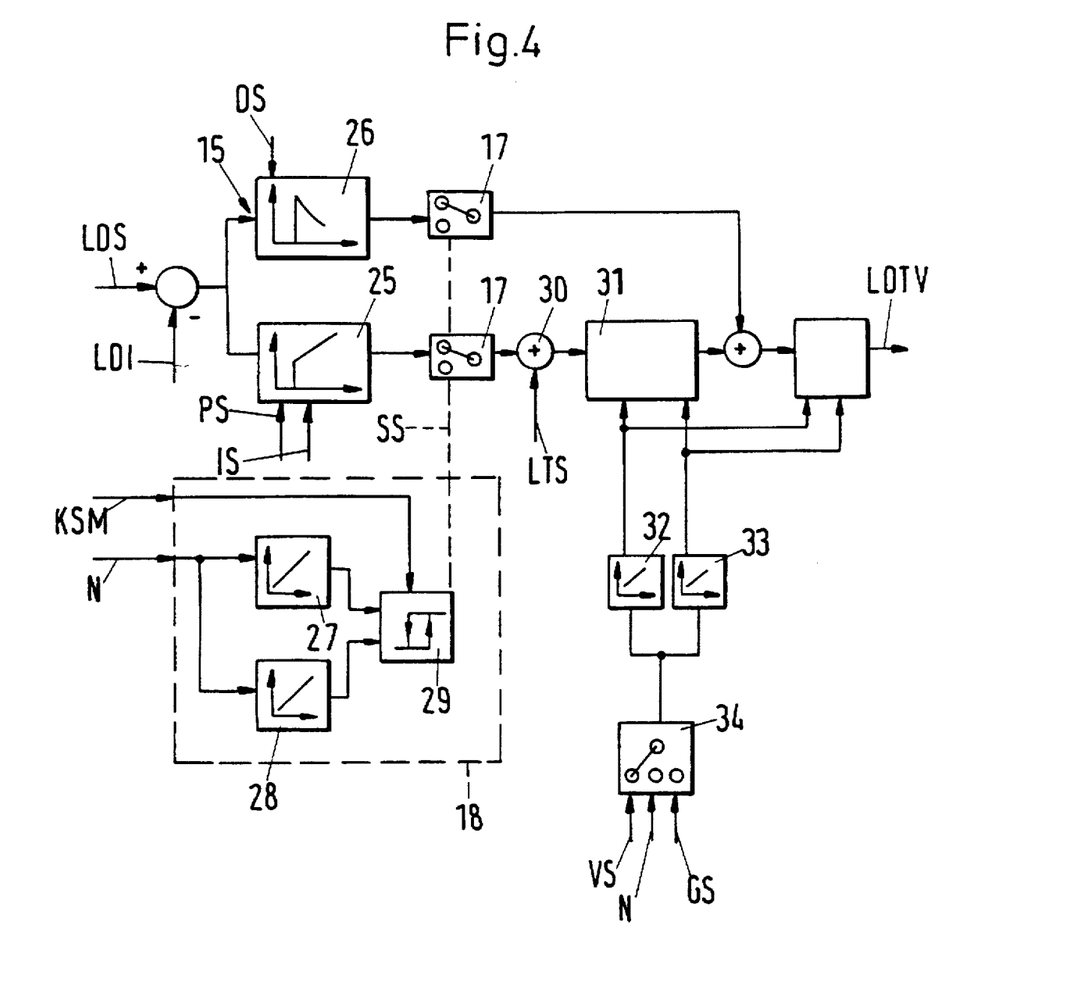
FIG. 4. is a detailed schematic block diagram showing the details of a typical output pressure control for use in the arrangement shown in FIG. 1.

At the output of the adaptation unit, values for the amplification of the P, I and D components and T1 are provided in the form of signals designated PS, IS, DS and T1, and these are supplied to the PI controller 25 and/or the DT1 regulator 26 as shown in FIG. 4.

Therefore, the adaptation of the regulator parameters takes place according to the setting of the adaptation switch 40, i.e., the factors read out from the amplification curves 41, 42, 43 and 44 depend either on consumption, on speed, or on the transmission gear then in use.

The engine load regions in which the engine is operated are illustrated in the speed/fuel flow rate diagram in FIG. 5. The dependency of the fuel injection flow rate signal KSM on the speed N is shown by the plotted full-load line 50. Further, the upper and lower characteristic curves 27 and 28, explained above with reference to FIG. 4, are spaced apart by the hysteresis 29. In the first engine load region LB1 underneath the lower curve 28, the pressure controller 2 is switched off and the servo element of the turbocharger is controlled exclusively by the parameter-based pressure control unit 1. If the fuel flow rate signal KSM rises above the upper characteristic curve 27 dependent on speed, the pressure controller 2 is switched on. If the fuel flow rate signal KSM falls below the lower curve 28, the pressure controller is then switched off.

Although the invention has been described herein with reference to specific embodiments, many modifications and variations therein will readily occur to those skilled in the art. Accordingly, all such variations are included within the intended scope of the invention.

We claim:

1. A control arrangement for the output pressure of a turbocharger for an internal combustion engine comprising a servo element to control the operation of the turbocharger and control means to actuate the servo element in accordance with at least the speed of the engine wherein the control means includes at least one target diagram for providing turbocharger output pressure target data based on an engine operating parameter and means for reading out target data from the target diagram of the control means to control the turbocharger output pressure when the engine is operating in a first engine load range, and a turbocharger output pressure controller for controlling the turbocharger output pressure when the engine is operating in a second engine load range including means for providing a pre-control based on target data read out of the target diagram.

2. A control arrangement according to claim 1 wherein the control means controls a switchover between the parameter-based output pressure control in the first engine load range and the pressure controller operation in the second engine load range in accordance with a speed-dependent fuel supply rate signal.

3. A control arrangement according to claim 2 wherein the control means reads target data out of the target diagram as a function of a rotational engine speed signal and a fuel injection rate signal when the engine is operating in the first load engine range.

4. A control arrangement according to claim 3 wherein the control means selectively reads the target data out of a plurality of characteristic target diagrams in accordance with a vehicle operating mode signal.

5. A control arrangement according to claim 3 wherein the control means includes means for correcting target data signals based upon data read out from correction diagrams as a function of at least one of atmospheric pressure and ambient air temperature signals.

6. A control arrangement according to claim 5 wherein the turbocharger output pressure controller is a PID controller formed of a PI regulator and a DT1 controller connected in parallel, the PID controller being supplied with target data signals obtained from the characteristic target diagrams as target turbocharger output pressure values and with an actual turbocharger output pressure value obtained from a detected turbocharger output pressure.

7. A control arrangement according to claim 6 wherein an output of the PI controller is combined with the target data signals for pre-control and the resulting signal is combined with an output of the turbocharger output pressure controller.

8. A control arrangement according to claim 7 wherein the turbocharger has a variable geometry and operation of the servo element causes a change in the turbocharger geometry and wherein the turbocharger output pressure controller responds to parameters which are subjected to a controlled adaptation on the basis of the turbocharger geometry as it varies during operation of the variable geometry, and including means for reading out an adaptation factor from at least one characteristic curve as a function of at least one engine operating parameter and means for multiplying the adaption factor by a constant which is determined by the turbocharger output pressure controller parameter and which is dependent on the turbocharger output pressure variation to produce an adapted turbocharger output pressure controller parameter.

9. A control arrangement according to claim 8 wherein the adaptation factor is read out as a function of at least one of the engine rotational speed, a fuel consumption signal and a transmission gear identification signal.

10. A control arrangement according to claim 1 including an exhaust gas return and including means for controlling the exhaust gas return when the engine is operating in the first engine load range and for switching off the exhaust gas return when the engine is operating in the second engine load range.

* * * * *

UNITED STATES PATENT AND TRADEMARK OFFICE
CERTIFICATE OF CORRRECTION

PATENT NO. : 5,782,092
DATED : July 21, 1998
INVENTOR(S) : Winfried Schultralbers, et. al.

It is certified that error appears in the above-identified patent and that said Letters Patent is hereby corrected as shown below:

Title page, item [56], References Cited, add the followings:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | 4 | 4 | 8 | 5 | 6 | 2 | 5 | 12/4/84 | Fujimoto et al. | | | |
| | 4 | 6 | 7 | 1 | 0 | 6 | 8 | 6/9/87 | Moody et al. | | | |
| | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 3 | 2 | 3 | 2 | 5 | 6 | 7/5/89 | Europe | | | | |
| | | | | | | | | | | | | | | |

Signed and Sealed this

Ninth Day of March, 1999

Attest:

Attesting Officer

Q. TODD DICKINSON

Acting Commissioner of Patents and Trademarks